United States Patent [19]

Kawasaki

[11] Patent Number: 5,373,531
[45] Date of Patent: Dec. 13, 1994

[54] SIGNAL ACQUISITION AND RECEPTION METHOD FOR A GLOBAL POSITIONING SYSTEM SIGNAL

[75] Inventor: Kenichiro Kawasaki, Saitama, Japan

[73] Assignee: Pioneer Electronic Corporation, Tokyo, Japan

[21] Appl. No.: 102,045

[22] Filed: Aug. 4, 1993

[30] Foreign Application Priority Data

Aug. 5, 1992 [JP] Japan ................................. 4-208769

[51] Int. Cl.5 .............................................. H04K 1/00
[52] U.S. Cl. ......................................... 375/1; 380/34; 342/357
[58] Field of Search .............. 342/357; 375/1; 380/34; 455/12.1

[56] References Cited

U.S. PATENT DOCUMENTS

| 4,445,118 | 4/1984 | Taylor et al. | 342/357 |
| 5,202,694 | 4/1993 | Farmer et al. | 342/357 |
| 5,203,030 | 4/1993 | Kawasaki | 375/1 X |
| 5,293,170 | 3/1994 | Lorenz et al. | 342/357 X |

Primary Examiner—Tod R. Swann
Attorney, Agent, or Firm—Sughrue, Mion, Zinn, Macpeak & Seas

[57] ABSTRACT

A signal acquisition method for a GPS receiver which eliminates the necessity of a clock circuit for keeping the current time and also a backup battery for memory is disclosed. According to the signal acquisition method, upon starting of acquisition of a GPS satellite after the power source to the GPS receiver is turned on, using a matched filter, an acquisition operation is performed for objects of all of GPS satellites which may possibly be disposed until after a signal of at least one of the GPS satellites is acquired.

11 Claims, 4 Drawing Sheets

SIGNAL ACQUISITION AND RECEPTION METHOD FOR A GLOBAL POSITIONING SYSTEM SIGNAL

BACKGROUND OF THE INVENTION

1. Field of the Invention

This invention relates to a signal acquisition and reception method for a Global Positioning System signal receiver.

2. Description of the Prior Art

Signals transmitted from GPS (Global Positioning System) satellites are available to the public and are transmitted by phase modulating a carder signal at 1,575.42 MHz with navigation information about the orbit of the satellite. The modulated carder is then spread spectrum modulated with a specific C/A code for each satellite. A GPS receiver generates a code synchronized with the C/A code of the particular satellite to demodulate the signal and reproduce the carrier signal so that the navigation information can be decoded.

The navigation information contains orbit data divided into two components with highly accurate ephemeris component and with a comparatively low degree of accuracy almanac component. The ephemeris component is used to calculate the position of the satellite accurately, and the almanac component is used to calculate the general area where the satellite is located.

The ephemeris component with respect to the transmitting satellite is transmitted in the navigation message, while the almanac component providing the general area of location for all available GPS satellites is successively transmitted in units of a frame. Accordingly, if the navigation data is collected for a certain period of time, the almanac data for all available satellites will be obtained.

The frequency of the carrier signal from the GPS satellite fluctuates within a certain range as viewed from the GPS receiver due to a Doppler effect arising from the fact that the satellite is moving at a high speed and also due to a frequency deviation of the reference oscillator in the receiver. Further, before the distance between the receiver and the satellite is known, since the propagation time of a signal is unknown, also the phase of the code by which the signal is multiplied in order to spread spectrum is unknown. Therefore, the receiver must search for the carrier frequency and the code phase of the satellite when the GPS receiver is turned on to acquire the signal of the satellite.

Since GPS satellites are orbiting, they are always moving, as viewed from the receiver. In addition, the number of GPS satellites from which signals can be received at a particular position on the earth's surface varies depending upon the orbits of the satellites, the position of the GPS receiver, and the instant in time when the GPS receiver is searching for a satellite. Accordingly, in order to reduce the time required to acquire a signal of a satellite from the initial operation of the GPS receiver, calculation of the orbits of satellites is performed using the almanac component of the satellite, a rough position of the GPS receiver at that particular instant in time is calculated, and those satellites from which signals can be received are set as objects of the initial search.

To this end, in conventional receivers, when power to the receiver is cut, almanac data collected and position data of the receiver measured during the previous reception cycle are stored in memory with battery backup, or in non-volatile memory such as an EE-PROM, bubble memory, or flash-RAM, rot the like, and the time is kept by a clock circuit which also operates with battery backup.

Synchronous tracking of a carrier signal is performed by means of a Costas loop, and to this end an I register, a Q register, and a carrier signal generation circuit are provided. Synchronous tracking of a C/A code is performed by means of a DLL (delay lock loop), and to this end, an E register, and L register, and a C/A code generation circuit are provided. Further, in order to acquire a signal and to control the synchronous tracking operation to calculate the position of the GPS receiver, a control calculation circuit including a CPU, a ROM, and RAM are provided.

When a signal is to be acquired, a carrier signal and a C/A code are generated in the GPS receiver and supplied to the I and Q registers to obtain a correlation to the received signal. A peak of the correlation is searched for and obtained by changing the frequency of the generated carrier signal and the phase of the C/A code, so that the object satellite can be acquired.

After the signal is acquired, the difference in phase between the received signal and the generated carrier signal is measured using the I and Q registers, and the carrier signal generation circuit is controlled in response to the phase difference to effect synchronous tracking of the carrier component of the reception signal. Simultaneously, the difference in phase between the received signal and the generated C/A code is measured using the E and L registers, and the code generation circuit is controlled in response to the phase difference to synchronously track the C/A code component of the received signal.

The CPU calculates a value corresponding to the distance between the satellite and the GPS receiver including an error caused by the clock of the receiver, referred to as the pseudorange from the phase of the code being synchronously tracked. The CPU collects such pseudoranges and navigation information of the four satellites, calculates the precise distance from each of the satellites' position using the four pseudoranges and the ephemeris data, and computes the accurate position of the GPS receiver including the latitude, longitude, and altitude, and a displacement of the clock of the receiver from the accurately controlled GPS reference time.

A radio frequency circuit, hereinafter referred to as an RF circuit, and a signal processing circuit of a conventional GPS receiver as described above are described below with reference to FIG. 3 and FIG. 4 respectively, with the RF circuit shown in FIG. 3 described first.

Referring to FIG. 3, a radio wave from a GPS satellite is initially received by an antenna 1, and then amplified by a low noise amplifier (LNA) 2, whereafter it is mixed with an output of a local oscillator (LO) 4 by a mixer 3 so that it is converted into a signal of an intermediate frequency (IF). The IF signal is passed through an IF band pass filter (IF-BPF) 5 to remove undesirable noise from the signal, and is then amplified by an IF amplifier (AMP) 6. The output signal of the IF amplifier 6 is quantized by one bit quantization by a limiter 7 in order to allow the following signal processing to be performed digitally. Finally, the quantized signal is output as an IF signal to the signal processing circuit of FIG. 4.

A reference oscillator 8 supplies a reference frequency signal to the local oscillator and to the signal processing circuit of FIG. 4. The local oscillator 4 forms a PLL (Phase Locked Loop) circuit based on the reference frequency signal and generates a local signal for converting the GPS signal from the satellite into an intermediate frequency signal.

Referring to FIG. 4, an IF signal is input to the signal processing circuit and compared with a code signal received from the code generation circuit 12 by an EXOR (exclusive-OR) circuit 11 to remove the code component from the IF signal. The resulting signal is supplied to the UP terminals of an I counter 13 and a Q counter 14.

The I counter 13 and the Q counter 14 are synchronous bi-directional counters. Both the I counter 13 and the Q counter 14 count in response to the rising edge of a clock signal received at the CK terminal of the respective counter. The counter increments when the UP terminal is set to 37 1" and decrements when the UP terminal is set to "0".

A carrier signal generation circuit 15 generates clock signals ICK and QCK at a predetermined frequency set by the CPU 16. The clock signals ICK and QCK have phases out of phase by 90 degrees from each other and are supplied to the CK terminals of the I counter 13 and the Q counter 14 respectively.

The count values of the I counter 13 and the Q counter 14 are initially stored in an I register 17 and a Q register 18 respectively, and then transferred to the CPU 16 by a data bus. The CPU 16 measures, upon synchronous tracking of a signal, the phase difference of the IF signal from the clock signals ICK and QCK output from the carrier generation circuit 15 using the values of the I register and the Q register. After the signal has been acquired, the value of, for example, $I^2+Q^2$ is calculated to measure the intensity of the reception signal.

The code generation circuit 12 generates a CODE signal synchronized with a code component included in the reception signal, and EARLY signal advanced in phase by 0.5 chips to the CODE signal and a LATE signal delayed in phase by 0.5 chips from the CODE signal. Contents of the CODE signal are set by the CPU 16 to coincide with a C/A code of a satellite from which a signal is desired to be received.

The phases of the CODE signal, the EARLY signal, and the LATE signal can be advanced or delayed by a suitable magnitude by the CPU 16. The code generation circuit 12 also produces an EPOCH signal which serves as a reference signal to control the counters and registers having a value of "1" at the top of every CODE signal cycle. The EPOCH signal is synchronized with the CODE signal and supplied to the counter control circuit 19 and the CPU 16.

The carder signal is removed from the IF signal by performing an exclusive-or function using the EXOR circuit 20 on the carrier signal and the clock signal QCK from the carrier generation circuit 15. The IF signal is then compared with the EARLY signal and the LATE signal from the code generation circuit 12 by a pair of EXOR circuits 21 and 22, respectively. The output signals of the EXOR circuits 21 and 22 are input to UP terminals of an E counter 23 and an L counter 24, respectively, so that they are counted up or down in response to a clock signal ELCK from a clock generation circuit 27.

The count values of the E and L counters 23 and 24 are first stored in an E register 25 and an L register 26, respectively, and then transferred to the CPU 16 by a data bus. The values of the E register 25 and the L register 26 indicate the degree of correlation between the IF signal and the EARLY signal and the degree of correlation between the IF signal and the LATE signal, respectively. The CPU 16 calculates, upon synchronous tracking of the C/A code, the difference between the value of the E register and value of the L register, and calculates, from the value of the difference, the difference in phase between the CODE signal output from the code generation circuit 12 and the code component included in the IF signal.

Each of the four counters 13, 14, 23, and 24 have an EN (enable) terminal and a CL (clear) terminal for controlling the counting operation of the counter. The EN terminal enables the counting operation of the counter when it receives "1", and disables the counting operation when it receives "0". The count value of the counter is cleared to zero on the rising edge of the clock signal when the CL terminal is set to "1". When the CL terminal is set to "0", the value of the counter is not cleared.

Each of the four registers 17, 18, 25, and 26 fetch, when the input to an LD (load) terminal of the corresponding register is set to "1", the value at the input terminal Dn of that register. Even if the input to the Dn terminal changes after a value has been input into the register, the value in the register remains the same and is output a Qn terminal of the register until the LD terminal rises again.

The counter control circuit 19 outputs an enable signal EN and a clear signal CL for the counters and a load signal LD for the registers with reference to the EPOCH signal supplied to the counter control circuit 19 from the code generation circuit 12. Each counter performs an accumulation operation for one period (1 msec) of the C/A code by repeating a counting up operation or a counting down operation and transfers its accumulation value (count value) to a respective register.

For example, when the EPOCH signal is generated at the top of a code from the code generation circuit 12, the counter control circuit 19 sets the enable signal EN to "0" to stop operation of the counters and then outputs a load signal LD to cause the values accumulated in the counters up until that time to be read into the respective registers.

After the values accumulated in the counters up until that time are transferred from the counters to the registers in the manner described above, the counter control circuit 19 outputs a clear signal CL to clear the contents of the counters to zero and then returns the enable signal EN to "1" to resume counting operations of the counters to commence the accumulation operation for another period of the C/A code again.

The clock generation circuit 27 produces, based on a reference clock signal supplied clock generation circuit 27 from the reference oscillator 8 of the RF circuit in FIG. 3, clock signals MCK and ELCK to be supplied to the relevant components of the signal processing circuit. In particular, the clock generation circuit 27 supplies a master clock signal MCK which acts as a reference for the operation to the code generation circuit 12, the carrier generation circuit 15, and the counter control circuit 19. Another clock signal ELCK with a predetermined frequency is supplied to the E counter 23 and the L counter 24.

The CPU 16 executes a control program for the receiver held in the ROM 28 making use of RAM 29. The EPOCH signal is input to an interrupt terminal INT of the CPU 16, and in response to the EPOCH signal, an interrupt process is commenced. The values stored in the registers are read into the CPU 16 synchronously along with the EPOCH signal.

Before a signal of a satellite is acquired, the CPU 16 controls the carrier generation circuit 15 and the code generation circuit 12 to search a carrier frequency and a code phase respectively. The search range for the carrier frequency depends upon the Doppler frequency range of the satellite and a frequency deviation of the reference oscillator 8 in the receiver. The search range for the code phase is one period (1,023 chips) of the code.

During searching, the CPU 16 supervises the magnitude of the correlation while successively changing the phase of the code one by one chip at a certain carrier frequency. After the searching for 1,023 chips is completed, the carrier frequency is shifted by a suitable frequency width. Then, at the new carrier frequency position, searching for the code phase is repeated again.

Discovery of one correlation normally requires 1 msec, corresponding to the length of one period of the code. Accordingly, searching the entire range to be searched for the frequency and phase requires a time of:

(total number of steps for a frequency)×1,023×1 msec

The CPU 16 calculates, from the values of the I and Q registers 17 and 18, a value which makes an index to the correlation such as, for example, $I^2+Q^2$ or $|I|+|Q|$. When the value calculated exceeds a certain threshold value, the CPU 16 determines that the signal of the satellite is received and ends the searching operation. Thereafter, the CPU 16 enters a signal tracking operation.

Upon synchronous tracking of a signal, the CPU 16 calculates, from the values of the I and Q registers 17 and 18, a value corresponding to the phase difference between the reception signal and the carrier signal generated by the carrier generation circuit 15, and applies calculation of a loop filter to the value. Then, the CPU 16 controls the carrier generation circuit 15 in accordance with a result of the calculation so that the frequency of the carrier may track the reception signal. Simultaneously, the CPU 16 calculates, from the values of the E and L registers 25 and 26, the phase difference between the reception signal and the code generated by the code generation circuit 12 and applies calculation of a loop filter to the value. Then, the CPU 16 controls, in accordance with a result of the calculation, the code generation circuit 12 so that the phase of the code may track the reception signal.

While acquisition and synchronous tracking of a signal are performed in such a manner as described above, a receiver, which includes only one such signal processing circuit of FIG. 4, successively changes over the satellite for reception in a time-dividing condition to perform measurement of a pseudorange and collection of the navigation message for four satellites. On the other hand, another receiver, which includes four or more such signal processing circuits, can obtain pseudoranges and navigation messages while receiving signals from four satellites at a time. The CPU 16 thus performs calculation for position measurement to find out the current position of the receiver when pseudoranges and ephemeris data of four satellites are collected.

During operation of the receiver, the current position obtained by the position fix and the almanac data of the satellites are normally written into RAM 29. The RAM 29 consists of a RAM of the static type whose stored contents are held using a backup battery. While the power source to the receiver is interrupted, power is supplied from a battery 32 to the RAM 29 and the clock circuit (RTC) 30 by way of a power source switching circuit 31 so as to hold the contents of the RAM 29 and maintain a time counting operation of the clock circuit 30.

The clock circuit 30 includes a quartz oscillator and a counter (not shown) therein and always keeps the current time since it is backed up by the battery 32. The CPU 16 calibrates thee time of the clock circuit 30 when an accurate current time is obtained as a result of calculation for a position fix.

When a satellite is to be acquired first after the power source to the receiver is turned on, in order to reduce the time before acquisition, calculation for an orbit is performed based on position data of the receiver and almanac data of the satellites held in the RAM 29 and the current time maintained in the clock circuit 30 to find the rough positions of the satellites, and one of the satellites from which a signal can be received at the point of time is selected as an object for acquisition.

In the conventional signal processing circuit described above, since a satellite from which a signal can be received at a current point of time is selected as an object for acquisition based on calculation for an orbit after the power source to the receiver is turned on, almanac data collected during preceding reception, position information obtained by the last position fix, and the current time must be held also while the power source to the receiver is interrupted. Therefore, the expensive clock circuit 30 for counting the time and the battery 32 for backing up the clock circuit 30 and the RAM 39 are essential and required.

Further, it is another drawback of the conventional signal processing circuit in that, when data of the RAM 29 are destroyed by some cause while the power source is interrupted or where the receiver has not been used for such a long time that almanac data held in the RAM 29 become so old that they cannot be relied upon any more, a longer time than usual is required before acquisition of a signal of a satellite after turning on the power source, and consequently, operation of the receiver is not invariable and the reliability is low.

SUMMARY OF THE INVENTION

It is an object of the present invention to provide a signal acquisition method for a GPS receiver which eliminates the necessity of a clock circuit for keeping the current time and also of a backup battery for a memory.

In order to attain the object described above, according to an aspect of the present invention, there is provided a signal acquisition method for a GPS receiver, which includes the step of performing, upon starting of acquisition of a GPS satellite after the power source to the GPS receiver is turned on, using a matched filter, an acquisition operation for objects of all of GPS satellites which may possibly be disposed until after a signal of at least one of the GPS satellites is acquired.

In the signal acquisition method, until after a signal of at least one of GPS satellites which may possibly be disposed, acquisition is performed for objects of all of the GPS satellites, and consequently, the current position measured upon preceding reception, the almanac data of the satellites, and the current time are unnecessary. Consequently, the clock circuit for keeping the current time and the battery back up for memory during interruption of the power source are also unnecessary.

Accordingly, the receiver can be produced at a reduced cost. Further, since searching for a code phase is performed using a matched filter, the time required to acquire a signal of a first satellite after the power source is turned on can be reduced, and consequently, the reliability and the performance of the receiver are improved. Further, since all of the available satellites are set as objects for acquisition, operation of the receiver after the power source is turned on is fixed.

According to another aspect of the present invention, the signal acquisition method is performed efficiently with a GPS receiver circuit for a GPS receiver, which includes a radio frequency circuit for producing an intermediate frequency signal from a signal from a GPS satellite and a code search circuit constituted from a matched filter and operable when the power source to the GPS receiver is turned on to start acquisition of a signal of a GPS receiver for searching a code phase of the intermediate frequency signal from a signal being received from a GPS satellite to acquire the signal from the GPS satellite. A means for performing a phase search of the signal from the GPS satellite acquired by the code search circuit, and a means for performing a synchronous tracking operation for the signal from the GPS receiver are also included in the GPS receiver circuit for a GPS receiver.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
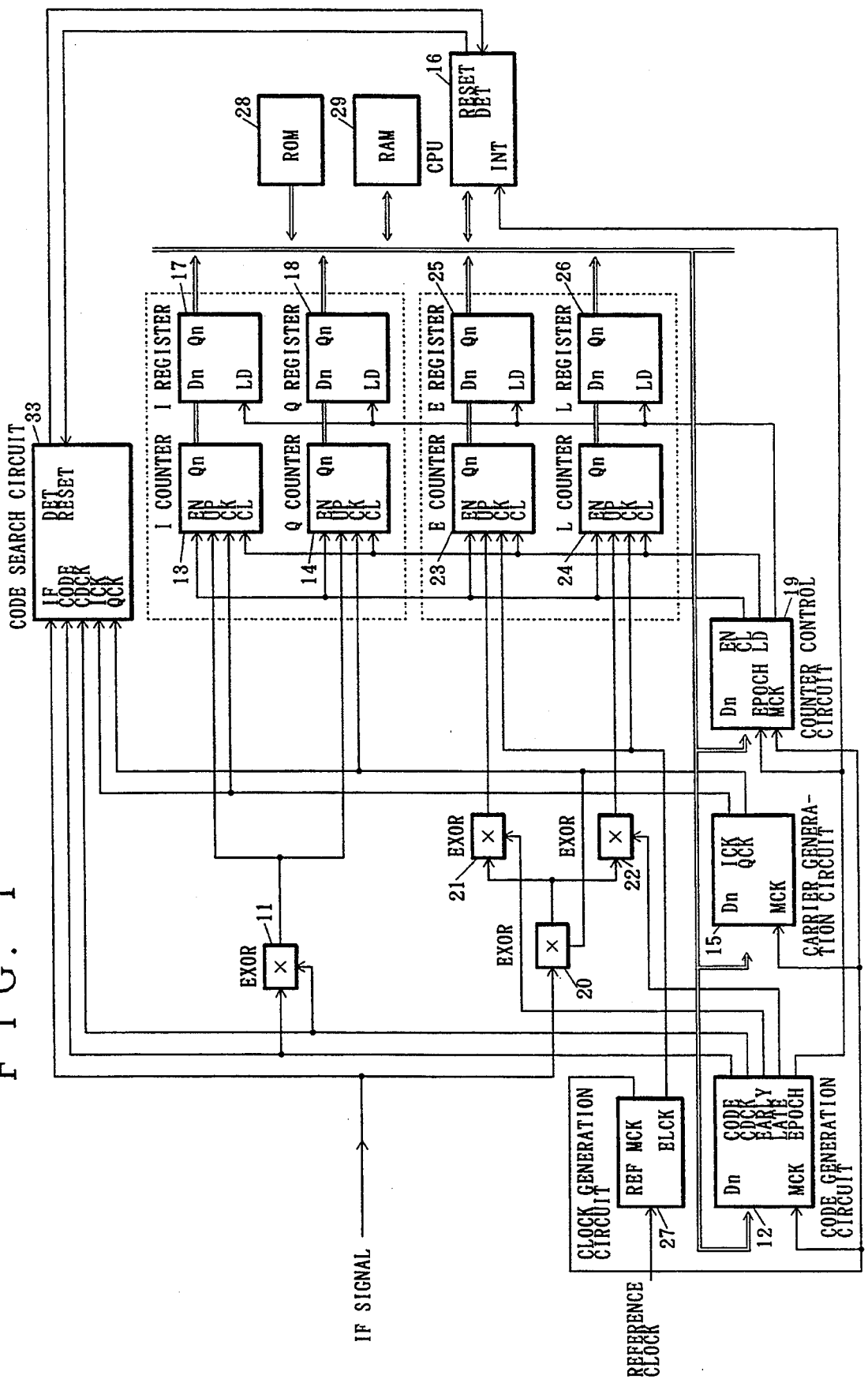
FIG. 1 is a block diagram of a signal processing circuit for a GPS receiver to which a signal acquisition method for an embodiment of a GPS receiver design according to the present invention.
Figure 3:
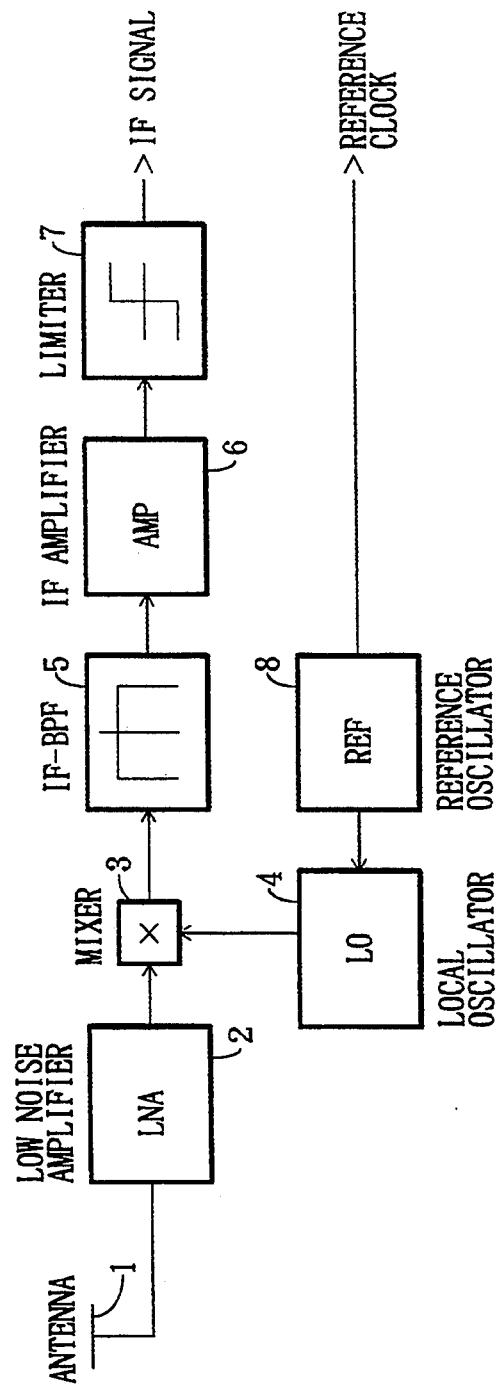
FIG. 3 is a block diagram of a RF circuit of a conventional GPS receiver.
Figure 4:
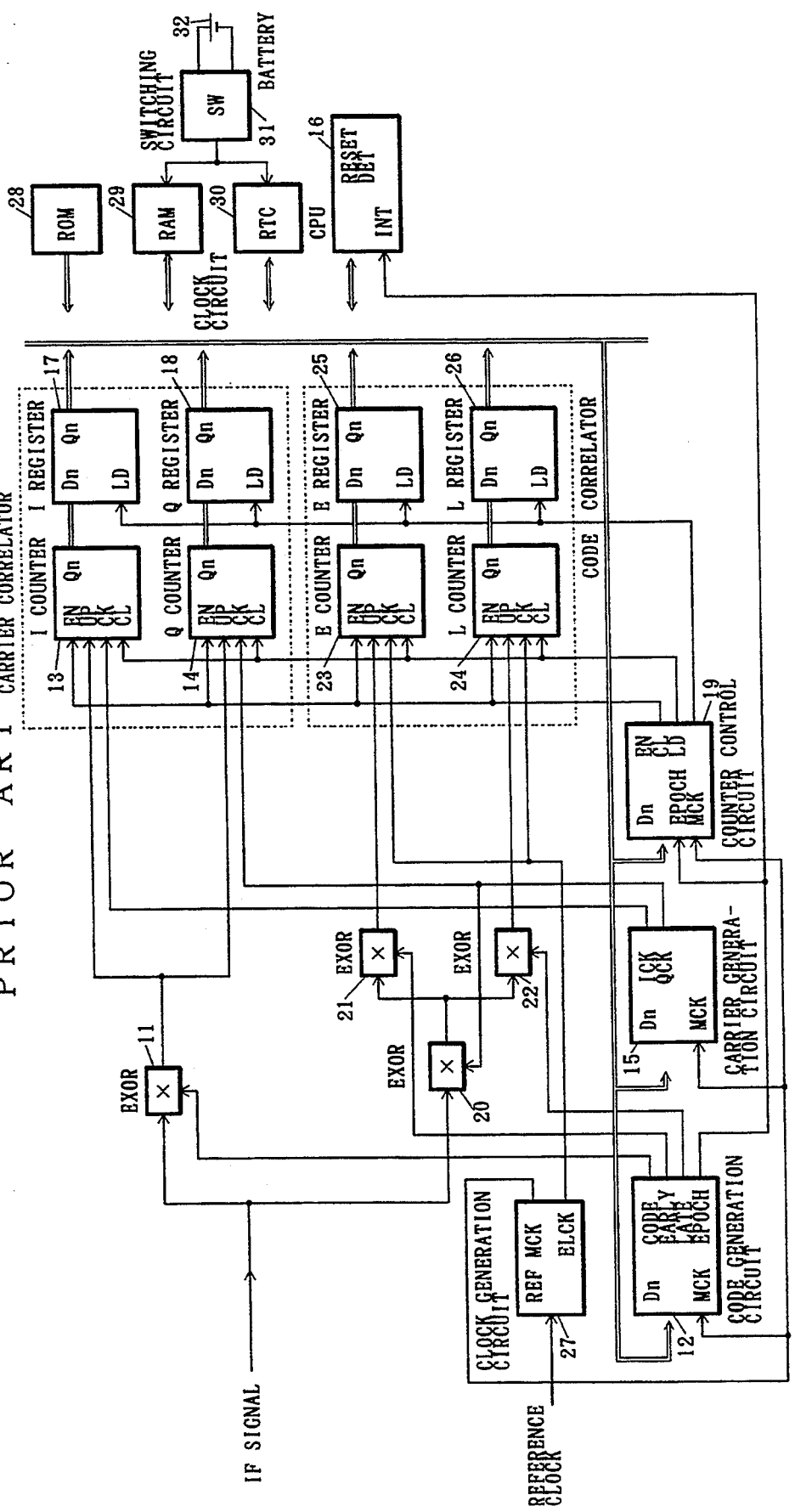
FIG. 4 is a circuit diagram of a signal processing circuit of a conventional GPS receiver.

Referring first to FIG. 1, a signal processing circuit for a GPS receiver is illustrated to which a signal acquisition method according to the present invention is applied. The signal processing circuit is connected to a RF circuit similar to the conventional RF circuit described above with reference to FIG. 3 and is an improved form of the conventional signal processing circuit described above with reference to FIG. 4. In particular, the signal processing circuit includes multiple exclusive-OR (EXOR) circuits 11, 20, 21, and 22, and I, Q, E, and L counters 13, 14, 23 and 24. Also included are I, Q, E, and L registers 17, 18, 25 and 26, a code generation circuit 15, a counter control circuit 19, a clock generation circuit 27, a ROM 28, RAM 29 and a CPU 16 which are similar to those of the conventional signal processing circuit of FIG. 4. The signal processing circuit further includes a code search circuit 33 in place of the clock circuit 30, the power source switching circuit 31, and the battery 32 provided in the conventional signal processing circuit of FIG. 4. The code search circuit 33 is constituted from a matched filter which operates in response also to an IF signal sampled with an asynchronous carrier, and performs searching of a code phase at a high rate in place of the I register 17 and the Q register 18 in the conventional signal processing circuit of FIG. 4.

Figure 2:
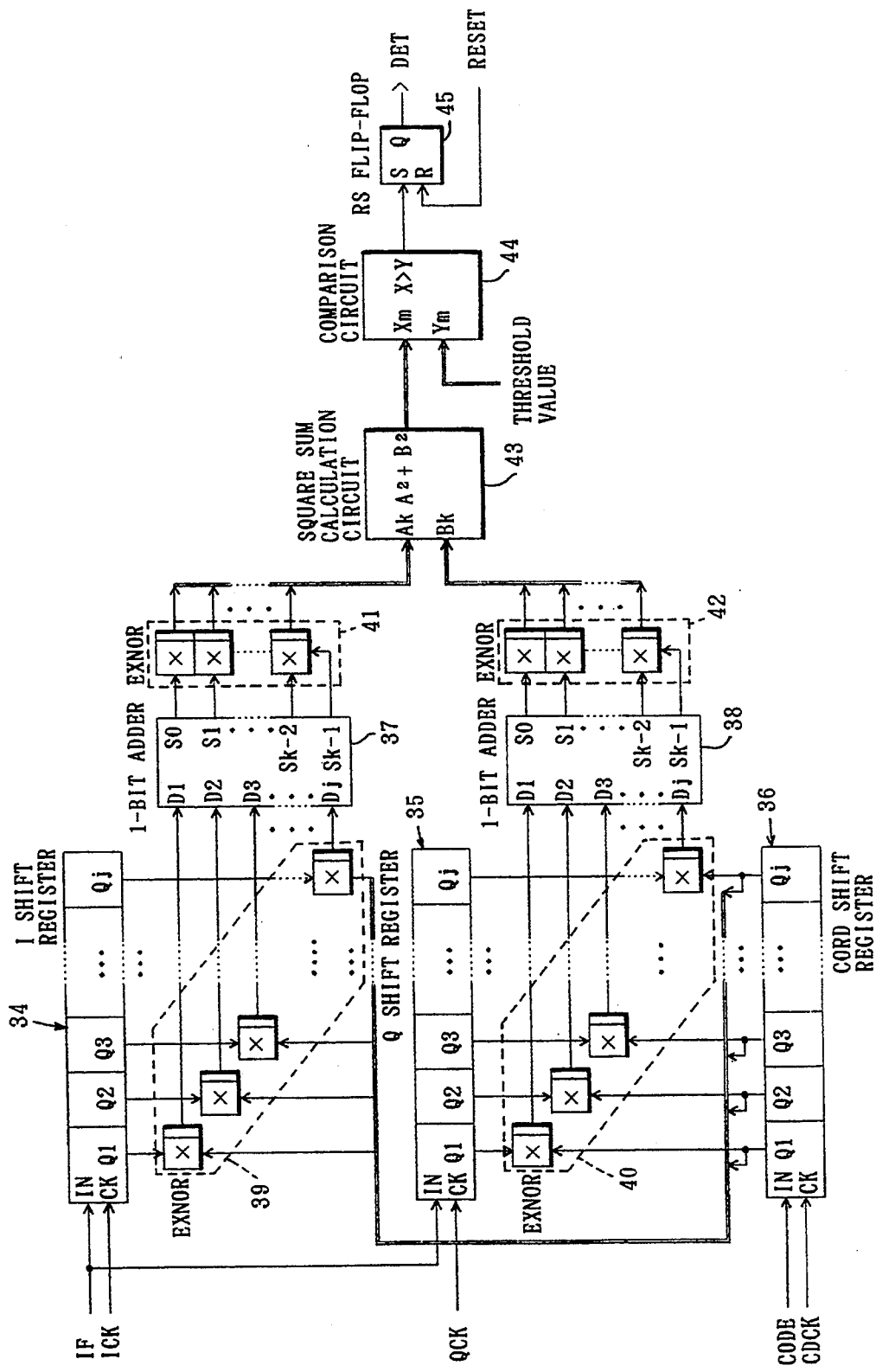
FIG. 2 is a circuit diagram showing a detailed construction of a code search circuit of the signal processing circuit of a GPS receiver according to the present invention as illustrated in FIG. 1.

A detailed construction of the code search circuit 33 is shown in FIG. 2. Referring to FIG. 2, the code search circuit 33 includes an I shift register 34, a Q shift register 35, a code shift register 36, a pair of 1-bit adders 37 and 38, EXNOR (exclusive NOR) gates 39 to 42, a square sum calculation circuit 43, a comparison circuit 44, and an RS flip-flop 45. Each of the shift registers 34, 35, and 36 has the number of steps corresponding to one period (1,023 chips) of the code.

The code shift register 36 takes in a CODE signal supplied thereto from the code generation circuit 12 as illustrated in FIG. 1 in response to a clock signal CDCK output in synchronism with the CODE signal from the code generation circuit 12 while shifting stored contents thereof. Then, at a point of time when the code for one period (1,023 chips) is taken in, the code generation circuit 12 stops the clock signal CDCK and the code shift register 36 outputs the values of the chips of the code at Q1 to Qj terminals thereof.

Meanwhile, the I shift register 34 takes in an IF signal input to an IN terminal thereof in response to a clock signal ICK input to a CK terminal thereof from the carrier generation circuit 15 while shifting stored contents thereof and outputs the thus stored contents from Q1 to Qj terminals thereof. Similarly, the Q shift register 35 takes in the IF signal input to an IN terminal thereof in response to another clock signal QCK having a phase different by 90° from that of the clock signal ICK while shifting stored contents thereof and outputs the stored contents from the Q1 to the Qj terminals thereof.

The outputs of the I shift register 34 and the code shift register 36 are supplied to the EXNOR gate 39 while the outputs of the Q register 35 and the code shift register 36 are supplied to the EXNOR gate 40 so that the corresponding bits are compared with each other, and the outputs of the EXNOR gates 39 and 40 are supplied to the 1-bit adders 37 and 38, respectively.

Each of the bit outputs of the EXNOR gates 39 and 40 presents the value "1" when the corresponding two bit inputs coincide with each other, but presents the value "0" when they do not coincide with each other. Taking the I shift register 34 and the code shift register 36 as an example, when all of the corresponding bits output from the I shift register 34 and the code shift register 36 coincide with each other, or in other words, when the outputs of the two shift registers 34 and 36 have a full positive correlation, all of the bit output by the EXNOR gates 39 are set to "1".

On the contrary, when the bits output from the I shift register 34 and the code shift register 36 do not coincide with each other, or in other words, when the outputs of the two shift registers 34 and 36 have a full negative correlation, the bit output by the EXNOR gate 39 are set to "0". It should be noted that actually the bit outputs of the EXNOR gate 39 normally exhibit a mixed condition of "1" and "0" in accordance with the magnitude of correlation. Also the EXNOR gate 40 operates in a similar manner to the EXNOR gate 39.

Each of the 1-bit adders 37 and 38 converts the number of "1" in the signals applied to input terminals D1 to Dj thereof into a natural binary value and outputs the natural binary value at S0 to Sk-1 terminals thereof. Accordingly, when the IF signal sampled with the clock and the code have a full positive correlation, the binary value output from each of the 1-bit adders 37 and 38 presents "1" at all of the columns (bits) thereof, but on the contrary when they have a full negative correlation, the binary value presents "0" at all of the columns (bits) thereof.

The outputs of the 1-bit adders 37 and 38 are supplied to EXNOR gates 41 and 42, respectively. The EXNOR gates 41 and 42 invert, when the MSB (most significant bit=uppermost column Sk-1) of the signal input thereto is "0", all "1" and "0" at the lower columns by EXNOR calculation so that the absolute value of the correlation may be represented in a natural number.

Consequently, those absolute values of correlations between the IF signal and the code sampled independently of each other with the clock signals ICK and QCK which are out of phase by 90 degrees from each other which are represented in natural binary numbers are input to input terminals Ak and Bk of the square sum calculation circuit 43, respectively. The square sum calculation circuit 43 calculates the square sum of the two input values represented in natural binary numbers. Consequently, the value $I^2+Q^2$ which represents the correlation of the code with the values of the IF signal sampled with the carriers which are orthogonal to each other in phase.

Since the correlation value $I^2+Q^2$ is updated each time the IF signal is sampled, while the IF signal for one period of the code is input, searching for a correlation of all code phases of a particular carrier frequency is completed.

The correlation value $I^2+Q^2$ obtained from the square sum calculation circuit 43 in a manner as described above is sent to the comparison circuit 44, at which it is compared with a preset threshold value. Since the result of such comparison is obtained for each sampling of the IF signal, it varies at a very high rate, and normally, the result of comparison cannot be read directly into the CPU 16. Therefore, in the code search circuit shown in FIG. 2, the RS flip-flop 45 is provided for latching the result of comparison.

In particular, when the correlation value $I^2+Q^2$ exceeds the preset threshold value, the output of the comparison circuit 44 presents the value "1", and in response to the value "1", the flip-flop 45 is set to "1" to latch the same. Then, the output Q="1" of the RS flip-flop 45 is transferred as a detection signal DET to the CPU 16.

If the CPU 16 receives such detection signal DET during searching for a code phase of a particular carrier frequency, then it determines that a signal of a satellite has been acquired with the carrier frequency, and resets the RS flip-flop 45 and then performs, at the position of the carrier frequency at which the correlation has been detected, phase searching using the I register 17 and the Q register 18 similarly as in the conventional receiver to find out the phase of the code accurately. Thereafter, the CPU 16 enters a synchronous tracking operation of the signal.

Even if searching for a code phase is performed in accordance with the same method as in the conventional signal processing circuit after the signal has been acquired, since the carrier frequency of the signal is already known, the time required for searching for a code phase again is so short that it can almost be ignored. It should be noted that alternatively the code phase when the correlation exceeds the threshold value is measured accurately by a counter or a like means and supplied to the CPU 16 so that the CPU 16 may immediately enter a synchronous tracking operation.

In the signal processing circuit described above, the length of a signal for which the correlation is supervised is set to a length for one period of the code. If the length for calculation of the correlation of the signal is set shorter than one period of the code, then the auto-correlation characteristic or the cross-correlation characteristic of the code is deteriorated so that an error in detection of the signal is caused, but if the length for calculation of the correlation is reduced within the range within which an error in detection does not occur frequently, then the circuit scale of the shift registers and so forth in FIG. 2 can be reduced. Instead, the circuit scale of the shift registers and so forth may be reduced by another method wherein the correlation is taken for the code from which chips are thinned out suitably.

Further, in the signal processing circuit described above, since the three shift registers 34, 35, and 36 have the equal number of steps, the frequency of the clock signals ICK and QCK is substantially equal to the chip frequency of the C/A code. However, the number of steps of the I shift register 34 and the Q shift register 35 need not be equal to that of the code shift register 36, and, for example, it may be greater than the number of steps of the code shift register 36. In this instance, the frequency of the clock signals ICK and QCK is higher than the chip frequency of the code, and the correlation calculation circuit takes a correlation of one chip of the code to a plurality of sample values of the IF signal.

Further, while the code shift register 36 does not shift but keeps the set code therein during calculation of a correlation, if the code is circulated, during calculation of a correlation, in the same direction as or the opposite direction to that of the signal and a correlation is calculated for a plurality of code phases for each sample of the signal, then searching for a code phase can be performed at a higher rate.

With the receiver to which the signal acquisition method of the present invention is applied, since a signal can be acquired at a higher rate than conventional receivers, all of satellites which may possibly be disposed as GPS satellites can be set as objects for searching upon signal acquisition immediately after the power source is turned on. While satellites from which signals can be received may be varied by a failure or the like of a satellite; since the C/A codes allocated to GPS satellites are determined in advance including a reserve GPS satellite or satellites, such variation does not give rise to any problems.

It is to be noted that, where the receiver includes only one such code search circuit 33 as described above, searching is performed changing over the C/A code in a time-dividing relationship in a suitable order. On the other hand, where the receiver includes a plurality of such code search circuits 33, searching may be performed simultaneously for a plurality of C/A codes as objects for searching.

The range of search for a code phase is the entire code phase naturally since the code search circuit 33 constituted from a matched filter is adopted. Meanwhile, the search range for a carrier frequency is set to a value forecast from the Doppler frequency range of a satellite and the frequency deviation of the reference oscillator of the receiver.

If a signal of a certain satellite is acquired after starting of a searching operation, the satellite is placed out of objects for searching, but a synchronous tracking operation is started for the satellite. At the point of time when a signal of one satellite is received, since the frequency deviation of the reference oscillator of the receiver is settled within the range of the Doppler frequency, the search range for a carrier frequency is thereafter narrowed so that acquisition of a signal of another satellite can be achieved in a further reduced time.

After synchronous tracking is started for satellites after signal acquisition, the ephemeris data for them are successively retrieved, and at a point of time when the ephemeris data for four satellites are taken in, a position fix is started. The time instant and the date can be determined, at a point of time when a first one of the satellites is acquired, in the accuracy in units of a second from information included in the navigation message of the signal from the satellite. Further, upon completion of the position fix based on the four satellites, the time of a very high degree of accuracy synchronized with the GPS time is obtained.

Where such a code search circuit 33 constituted from a matched filter as described above is employed, satellites can be acquired at a very high rate, and consequently, when a satellite is to be acquired first after the power source is turned on, there is no need of performing orbit calculation in advance as in conventional receivers and the almanac data collected upon preceding reception, the position of the receiver and the current time instant need not be held even during interruption of the power source. Naturally, the information included in the almanac data retrieved during reception can be used as in conventional receivers.

Naturally, almanac data collected upon preceding reception, the position of the receiver and other information regarding an operation condition of the receiver may alternatively be held also during interruption of the power source so that the information thus held may be utilized after turning on of the power source similarly as in conventional receivers. Also in this instance, after the power source is turned on, orbit calculation for acquisition of a satellite is not performed first, and accordingly, the clock circuit for keeping the time instant is unnecessary.

Having now fully described the invention, it will be apparent to one of ordinary skill in the art that many changes and modifications can be made thereto without departing from the spirit and scope of the invention as set forth herein.

What is claimed is:

1. A signal acquisition method for a GPS receiver, comprising the steps of:

searching, upon starting of acquisition of a GPS satellite after the power source to said GPS receiver is turned on, for a code phase of a signal in a range of all code phases for one period of the code, by using a matched filter; and continuing said searching for all GPS satellites, which may possibly be disposed, as objects for searching without calculating tracks of the satellites until a signal of at least one of the GPS satellites is acquired.

2. A GPS receiver circuit for a GPS receiver, comprising:

a radio frequency circuit for producing an intermediate frequency signal from a signal being received from a GPS satellite;

a code search circuit including a matched filter operable when the power source to said GPS receiver is turned on to initiate acquisition of a signal of a GPS receiver and being capable of searching for a code phase of said intermediate frequency signal in a range of all code phases for one period of the code;

means for accurately determining the phase of the code by performing a phase search of the signal from the GPS satellite acquired by said code search circuit; and means for performing a synchronous tracking operation for the signal from the GPS satellite.

3. A GPS receiver circuit as claimed in claim 2, wherein said code search circuit further includes intensity detection means for detecting an intensity of the reception signal, and comparison means for comparing the intensity detected by said intensity detection means with a predetermined threshold value to determine whether or not the signal from the GPS satellite has been acquired.

4. A GPS receiver circuit as claimed in claim 3, further comprising means for generating first and second clock signals having phases displaced by 90 degrees from each other, and a code generator for generating a code signal corresponding to a C/A code of a satellite from which a signal is to be received, said intensity detection means of said code search circuit including first and second serial-in parallel-out shift registers for receiving and shifting the intermediate frequency signal in response to the first and second clock signals, respectively, a serial-in parallel-out code shift register for receiving and shifting the code signal, first and second correlation determination means for comparing the parallel outputs of said first and second shift registers with the parallel outputs of said code shift register, respectively, to determine correlations between the intermediate frequency signal and the code signal, and intensity calculation means for calculating an intensity of the reception signal from the correlations from said first and second correlation determination means.

5. A GPS receiver circuit as claimed in claim 4, wherein each of said first and second correlation determination means includes an exclusive NOR circuit connected between the outputs of said first or second shift register and said code shift register, and discrimination means for discriminating the number of outputs of said exclusive NOR circuit which exhibit "1" or "0" in binary value.

6. A GPS receiver circuit as claimed in claim 5, wherein said discrimination means outputs the discriminated number in binary value and each of said first and second correlation determination means further includes a third exclusive NOR circuit connected to the outputs of said discrimination means such that, when the most significant bit of the outputs of said discrimination means is a predetermined one of the binary values of "1" and "0", the lower bits of the outputs of said discrimination are reversed in value, and said intensity calculation means is a square sum calculation circuit for calculating a square sum of the outputs of the third exclusive NOR circuits of said first and second correlation determination means.

7. A GPS receiver circuit as claimed in claim 2, which includes four or more such code search circuits.

8. A GPS receiver circuit as claimed in claim 2, further comprising means for causing, after a signal of a satellite is acquired, said code search circuit to perform a code searching operation for a signal of another satellite until signals of a total of four or more satellites are acquired.

9. A GPS receiver circuit as claimed in claim 3, further comprising means for generating first and second clock signals having phases displaced by 90 degrees from each other, and a code generator for generating a code signal corresponding to a C/A code of a satellite from which a signal is desired to be received, said intensity detection means of said code search circuit including first and second serial-in parallel-out shift registers for receiving and shifting the intermediate frequency signal in response to the first and second clock signals, respectively, a serial-in parallel-out code shift register for receiving and shifting the code signal in response to a code clock signal, first and second correlation determination means for comparing the parallel outputs of said first and second shift registers with the parallel outputs of said code shift register, respectively, to determine correlations between the intermediate frequency signal and the code signal, and intensity calculation means for calculating an intensity of the reception signal from the correlations determined by said first and second correlation determination means.

10. A GPS receiver circuit as claimed in claim 9, wherein each of said first and second correlation determination means includes exclusive NOR circuits connected between the outputs of said first or second shift register and said code shift register, and discrimination means for discriminating the number of outputs of said exclusive NOR circuits that indicate correlation.

11. A GPS receiver circuit as claimed in claim 10, wherein said discriminating means outputs the discriminated number of correlated outputs in binary form and each of said first and second correlation determination means further includes third exclusive NOR circuits connected to the outputs of said discrimination means arranged such that, when the most significant bit (MSB) of the outputs of said discrimination means is a predetermined one of the binary values of "1" and "0", values at the lower bits of the outputs of said discrimination means are inverted, and said intensity calculation means is a square sum calculation circuit for calculating a square sum of the outputs of the third exclusive NOR circuits of said first and second correlation determination means.

* * * * *